Jan. 12, 1932.　　　　G. S. SMITH　　　　1,840,797
MACHINE FOR ASSEMBLING NUTS AND BOLTS
Filed March 19, 1928　　　4 Sheets-Sheet 1
Fig.1.
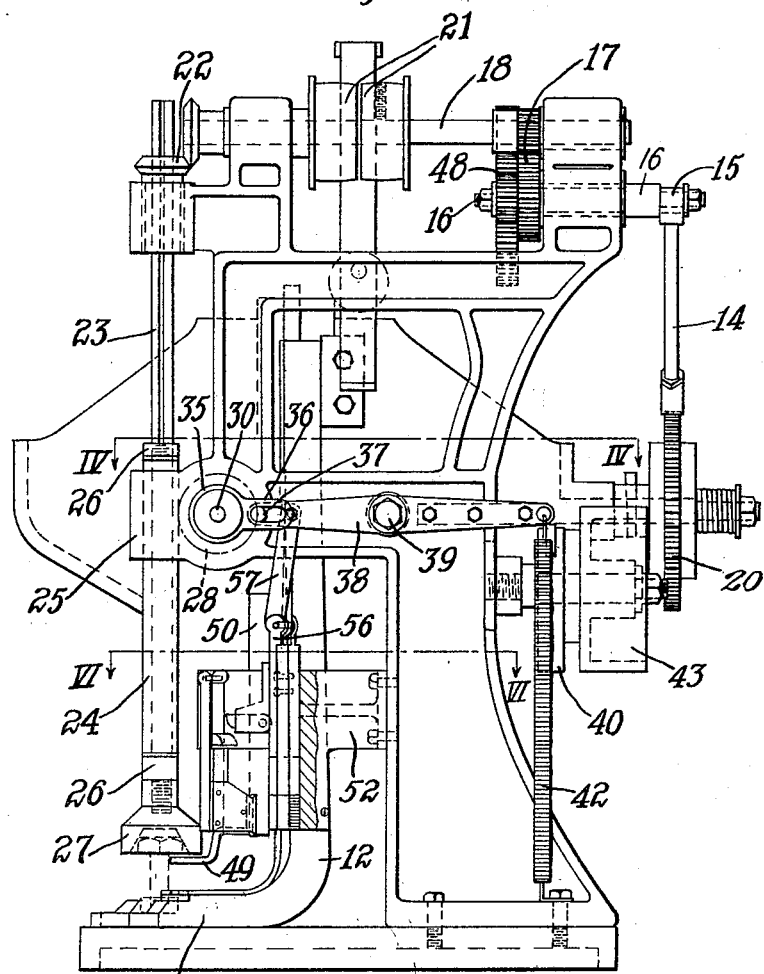
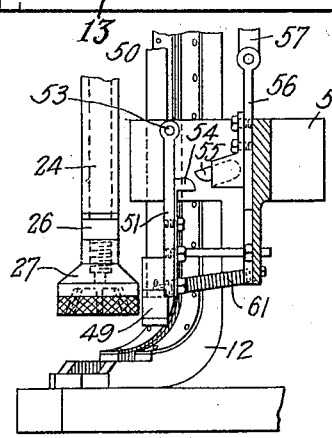
Fig.5
INVENTOR.
George S. Smith
BY Green & McCallister
His ATTORNEYS.

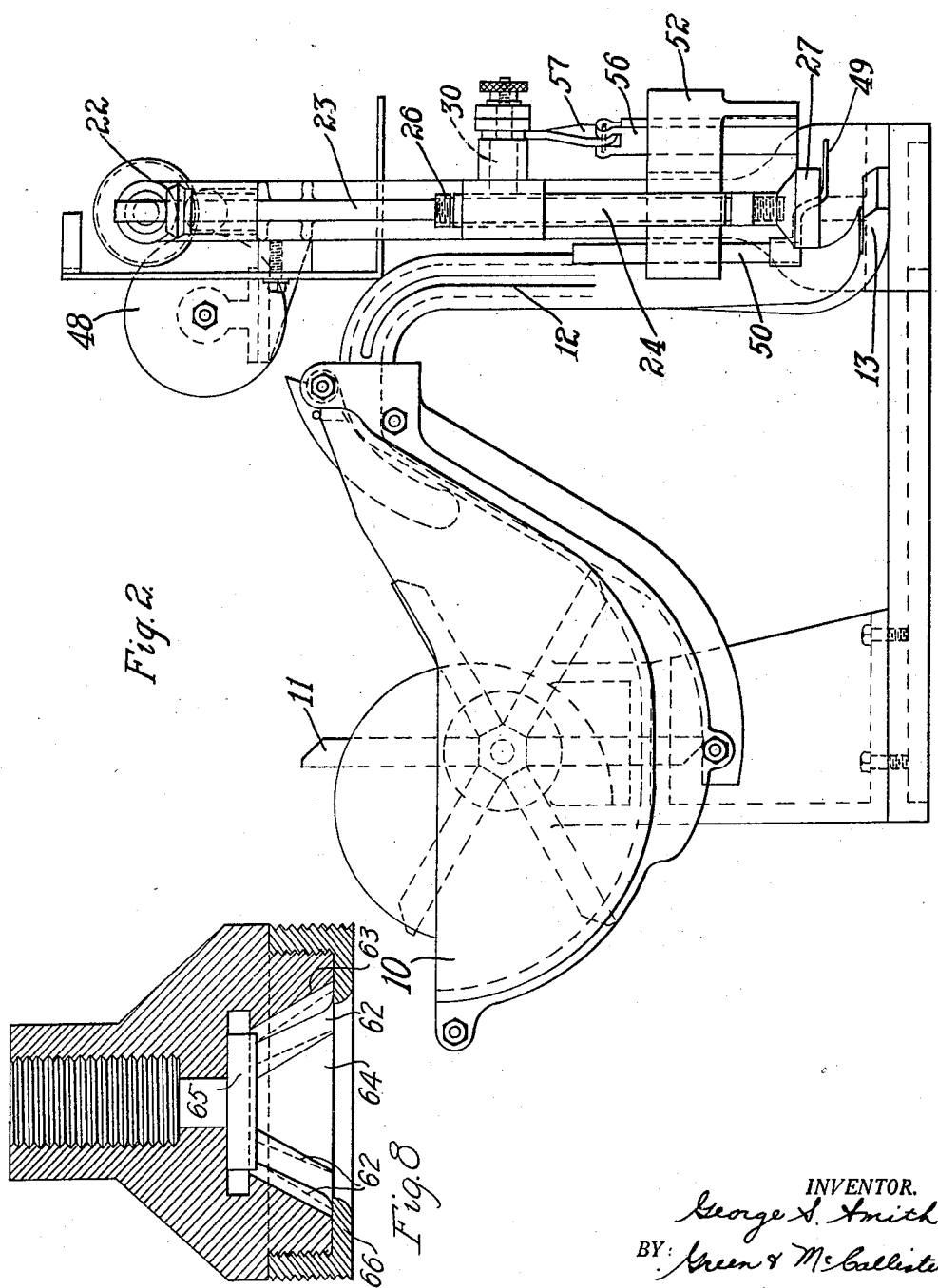

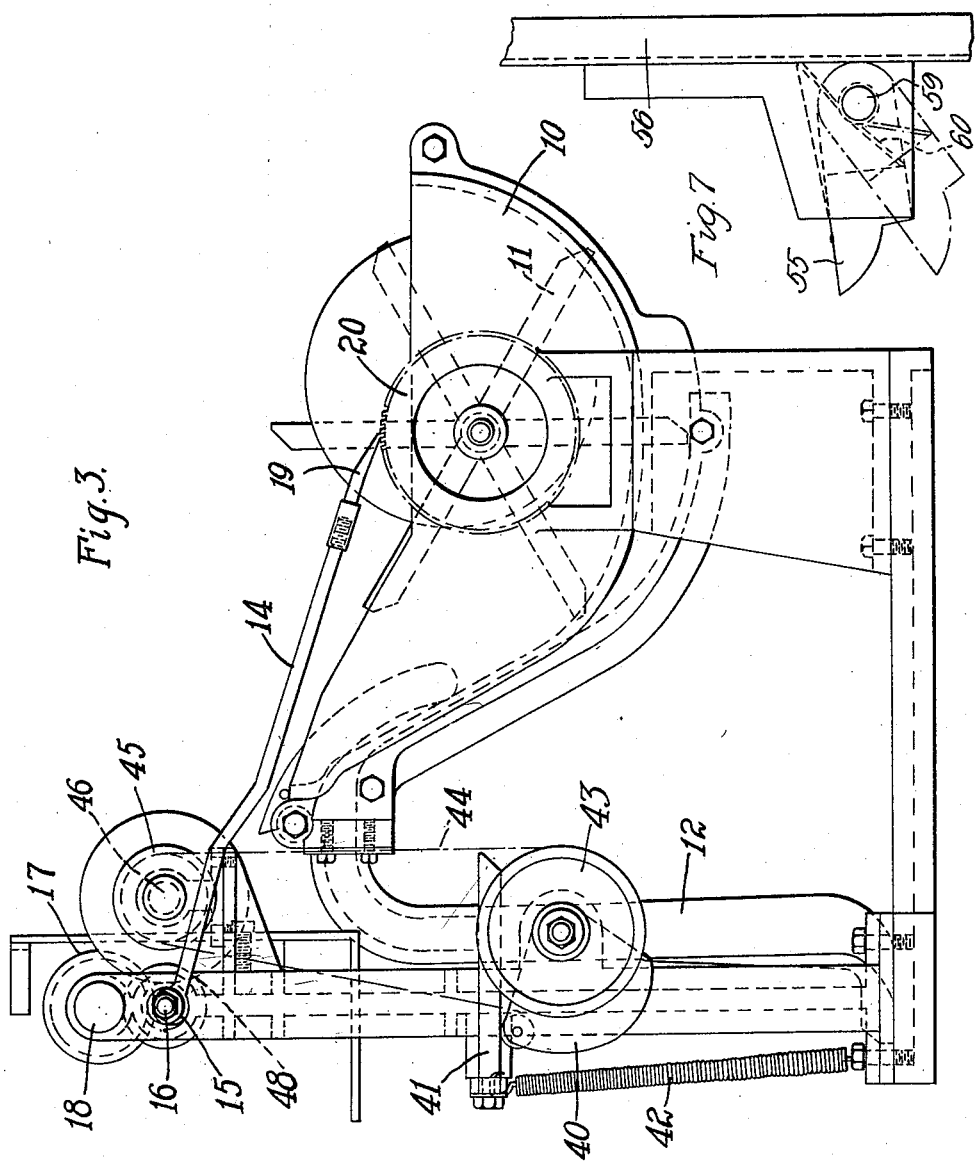

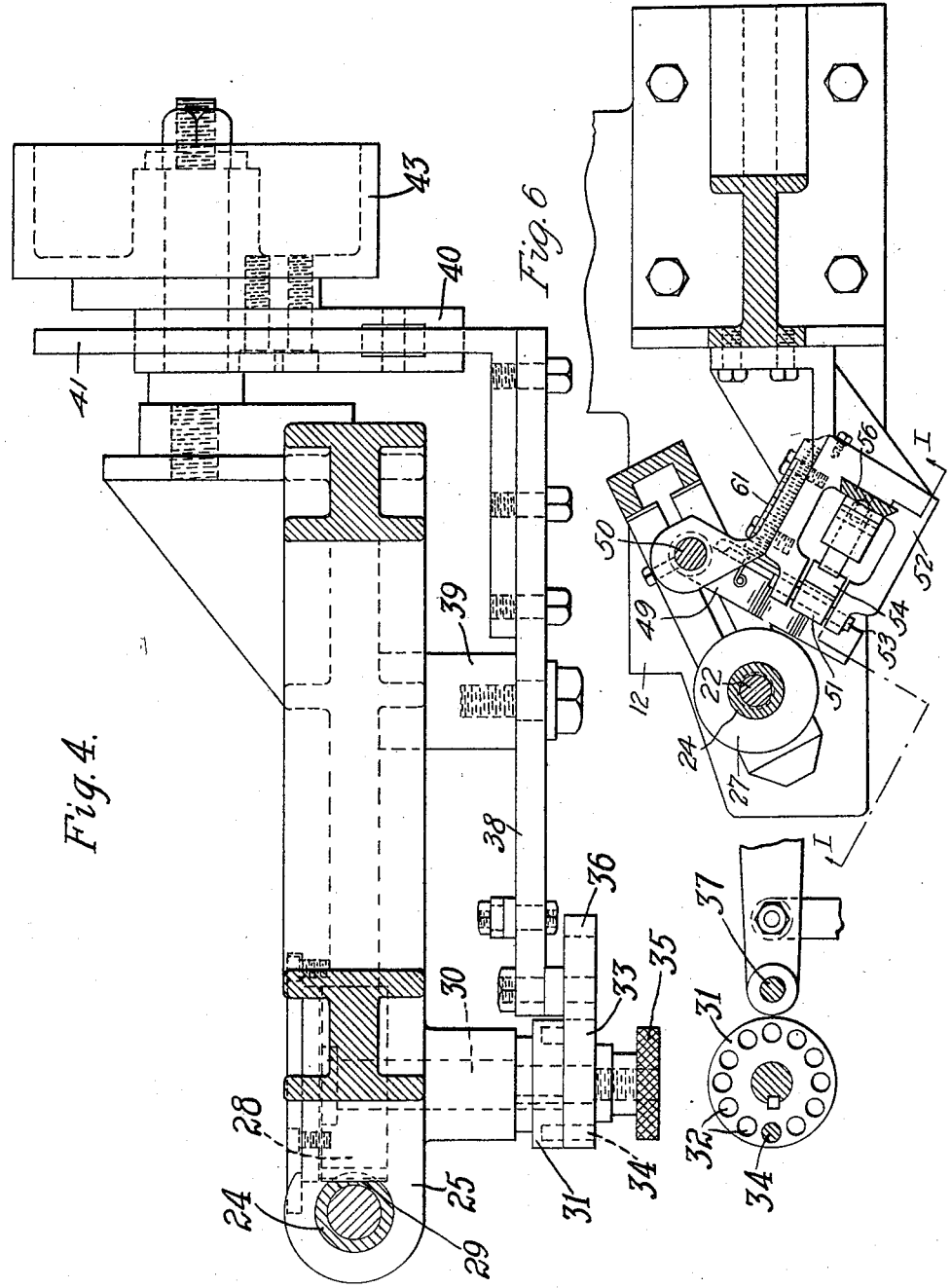

Patented Jan. 12, 1932

1,840,797

UNITED STATES PATENT OFFICE

GEORGE S. SMITH, OF PITTSBURGH, PENNSYLVANIA, ASSIGNOR TO PITTSBURGH SCREW & BOLT CORPORATION, A CORPORATION OF PENNSYLVANIA

MACHINE FOR ASSEMBLING NUTS AND BOLTS

Application filed March 19, 1928. Serial No. 262,712.

This invention relates to machines for assembling nut bolts and nuts for shipping, such as are commonly known as nutting machines.

An object of this invention is to provide a machine of this type having an improved construction and operation.

A further object is to provide a machine of the type set forth of such construction and arrangement as to prevent too tight nutting of a nut on a bolt in case of resistance.

A still further object is to provide a machine of the type set forth of rugged construction which will be cheap to manufacture and assemble and simple and easy to operate.

These and other objects which will be apparent to those skilled in this particular art are accomplished by means of the invention illustrated in the accompanying drawings, in which Figure 1 is a view in elevation of a machine constructed in accordance with one embodiment of this invention. Fig. 2 is a similar view taken from the left of Fig. 1. Fig. 3 is a similar view taken from the right of Fig. 1. Fig. 4 is a transverse sectional view on the line 4—4 of Fig. 1. Fig. 5 is an elevational view on an enlarged scale of certain of the elements shown in Fig. 1. Fig. 6 is a transverse sectional view of an enlarged scale taken on the line 6—6 of Fig. 1. Fig. 7 is an elevational view of a detail of the ejector mechanism and Fig. 8 is a transverse sectional view of the rotating head illustrating the mechanism for preventing the positive engagement of a bolt or nut by the head.

The particular construction which has been chosen for the purposes of illustration includes a nut feeding mechanism which, as shown, is of well known construction and includes a hopper 10 having rotary nut feeding arms 11 for feeding nuts one after the other into a feed chute 12 ending in a horizontal section 13 formed so that the nut is properly positioned for threading on a bolt, as is well known in the art. The said arms are intermittently rotated by an operating link 14 reciprocated by an eccentric 15 on a countershaft 16 driven through gearing 17 by the main driving shaft 18 of the machine. The opposite end of the operating link 14 has a finger 19 engaging a ratchet 20 operatively associated with the feeding fingers 11.

The power shaft 18 is driven from any suitable source of power and is provided with the usual fast and loose pulleys 21.

Beveled gearing 22 connects the power shaft to a rotary vertically reciprocable shaft 23 having a splined connection with the gearing 22 and extending downwardly through a sleeve 24 which is slidably mounted in a vertically extending bearing 25 and which is held against vertical movement relatively to the reciprocable shaft by suitable collars 26. A rotary head 27 is secured to the bottom of the shaft 23 and is adapted to engage the head of a bolt for rotating the same so as to thread it into a nut held in position therebeneath.

Suitable mechanism is provided for reciprocating the rotary shaft 23 so as to raise and lower the rotary head 27 into and out of operative relation with a bolt. As illustrated, this mechanism includes a gear 28 mounted in the bearing bracket 25 and engaging ratchet teeth 29 formed in the adjacent side of the sleeve 24. The gear is secured to a shaft 30 having a collar 31 fastened to the projecting end thereof. The collar is provided with a series of holes 32 in its outer face and a driving collar 33 having a pin 34 is rotatably mounted upon the projecting end of the shaft 30 and may be connected to the shaft driving collar 31 by inserting the pin in any of the holes 32. A clamping nut 35 is employed for clamping the parts in operative position. The driving collar 33 is provided with a crank arm 36 having a pin and slot connection 37 with an operating lever 38 pivoted on a supporting pivot 39.

Obviously, oscillation of the operating lever 38 causes a reciprocation of the rotary head 27 into and out of operative position, and the operative position of the rotary head can be adjusted so as to adapt the same for use with different lengths of bolts merely by changing the relative adjustment of the collars 31 and 33. This is done by separating the collars so as to permit a raising or lowering of the shaft 23 and sleeve 24, after which the pin 34 can be inserted in the adjacent opening 32 and the parts against clamping in operative position. This provides a simple and effective mechanism for adjusting the position of the rotary head 27 with relation to its operating means such as the lever 38, and the machine is thus adjustable for operation on bolts of any size. The operating lever 38 is actuated by a cam 40 which engages an angularly extending cam engaging arm 41 connected to the end of the operating lever 38 opposite from the shaft 23. A suitable spring 42 is employed for holding the lever in operative engagement with the cam. The latter is driven by a pulley 43 which is connected by a belt 44 to a pulley 45 mounted on a countershaft 47 which is driven from the shaft 16 by suitable reduction gearing 48.

Mechanism for ejecting the assembled bolts and nuts is provided and, as illustrated, includes an ejector arm 49 which is movably mounted on a vertically extending shaft 50 in position to be projected or swung against a bolt by a kicker lever 51 supported in a bracket 52 on a horizontal pin 53 with the lower end of the kicker engaging the ejector arm. A finger or lug 54 is secured to the ejector operating lever 51 and positioned in the path of movement of a vertically movable finger 55 projecting outwardly from a slide 56, slidably mounted in the bracket 52 and connected by a link 57 to the adjacent portion of the operating lever 38. The finger 55 is supported upon a pivot pin 59, see Fig. 7, and a spring 60 normally holds the finger in upper position as shown in full lines with the result that downward movement of the slide 56 brings the lower face of the finger 55 into engagement with the upper face of the cooperating finger 54 on the ejector lever 51. thus swinging the latter outwardly and oscillating the ejector finger 49. The latter is immediately retracted by a suitable spring 61, see Fig. 5. As the slide 56 moves upwardly the finger 55 yields upon engagement with the cooperating finger 54 and is shifted to the position indicated in dotted lines in Fig. 7, after which it is snapped back to the full line position by the spring 60. As a result the ejector arm 49 is operated only upon downward movement of the slide 56 which corresponds to upward movement of the rotary head 27 occurring after a nut and bolt have been threaded together.

It sometimes happens that the thread of a nut or a bolt is uneven or has such a defect that, if a nut and bolt are threaded together by a positive force, it will be practically impossible to unscrew them. In order to overcome this defect and for the purpose of causing the rotary head to yield in case there is undue resistance to the threading of any particular nut and bolt, the head is provided with a plurality of wedge-shaped bolt head engaging members 62, which are received in longitudinal slots 63 formed in the inclined inner surface 64 of the head. In order to facilitate manufacture, the head is cut out below the inner ends of the slots and a backing plate 65 positioned therein against which the inner ends of the wedge-members abut. The latter are held in position by a suitable clamping collar 66. The result of this construction is that the points of the wedges 62 engage the head of a bolt to be rotated.

It will be noted that the inner surface 64 of the rotating annular head has a circular, inwardly converging conic-section shape— this provision not only automatically accommodates bolt heads of different sizes, but also allows slippage over a given bolt head when an undue resistance to rotation is encountered—for, if there is a slight amount of play, that resistance tends to force the head of the bolt outwardly away from the converging, towards the diverging portion 64. If undue resistance to rotation is encountered, the points will jump over the corner of the bolt head and the latter will not be forced into a nut having a distorted or otherwise defaced thread.

In operation, the nuts are automatically fed down the chute 12 and slide one after the other into the horizontal portion 13 thereof. A bolt is positioned over the nut with the threaded end above the opening of the nut by an operator. The rotary head 27 is automatically lowered into engagement with the bolt head, causing the bolt to rotate rapidly and threading it into the associated nut. As the head is retracted upwardly the slide 56 descends and actuation of the ejector arm 49 takes place, the assembled bolt and nut being knocked out of the machine into an adjacent basket or the like. The machine may be quickly and easily adjusted for different lengths of bolts by means of the adjustable collars 31 and 33 which permit quick adjustment of the vertical position of the rotary head with relation to the angular position of the operating lever 38.

What I claim as new and desire to secure by Letters Patent is:

1. The combination in a machine for assembling bolts and nuts of a reciprocating rotary head for threading the nuts and bolts together, a cam driven operating lever for reciprocating said head and an ejector for the assembled articles operated by said lever.

2. The combination in a machine for assembling bolts and nuts of a rotary head, an ejector for ejecting the assembled bolts and nuts, a ratchet and gear mechanism for reciprocating said rotary head into and out of operative position, a cam driven operating lever for driving said mechanism, and means operated by said lever for actuating said ejector.

3. The combination in a bolt and nut assembling machine of a rotary head adapted to engage a bolt for rotating the same, an ejector arm supported adjacent the operative position of said head, a cam driven operating lever, mechanism for reciprocating said head into and out of operative position and means operated by said mechanism for actuating said ejector and including an actuator slide and means operated by movement of said slide for actuating said ejector.

4. The combination in a bolt and nut assembling machine of a reciprocating rotary head, an ejector arm for ejecting assembled bolts and nuts and actuating mechanism therefor including a sliding actuator, a pivoted striker associated with said actuator for operating said ejector arm and means for reciprocating said slide in timed relation to the operation of said head.

5. The combination in a bolt and nut assembling machine of a rotary head, a reciprocable sleeve for moving said head into and out of operative position, a gear for shifting said sleeve, operating mechanism for said gear including a pair of relatively adjustable collars and means for securing said collars in different relative positions.

6. The combination in a machine for assembling bolts and nuts of a rotary head, a reciprocable sleeve for moving said head into and out of operative position having a rack associated therewith, a gear engaging said rack and operating mechanism for said gear including a lever, a collar connected to said gear, a second collar connected to said lever and means for securing said collars together in different adjusted positions.

7. The combination in a machine for assembling bolts and nuts of a rotating annular head having a conically formed inner surface, slots in said surface, bolt engaging members in said slots projecting beyond said conical surface for engagement with a bolt or the like and means for securing said members in said slots.

8. The combination in a machine for assembling bolts and nuts, of a rotary head, said head including a driven shaft, a reciprocal sleeve mounted on said shaft for moving said head into and out of operative position, a cam operated oscillator lever for reciprocating said sleeve, and a ratchet and gear connection between said sleeve and said lever, a collar rotatable with said gear, a driving collar cooperating with said lever, and means for adjustably connecting said first mentioned collar to said driving collar.

9. The combination in a machine for assembling bolts and nuts, of a rotary head, said head including a driven shaft, a reciprocal sleeve mounted thereon for moving said head into and out of operative position, a cam operated oscillator lever for reciprocating said head, a ratchet and gear mechanism connecting said lever to said sleeve, and additional means for reciprocating said lever, a collar rotatable with said gear, a driving collar cooperating with said lever, and means for adjustably connecting said first mentioned collar to said driving collar.

10. The combination in a machine for assembling bolts and nuts, of a rotary head, a reciprocal sleeve for moving said head into and out of operative position, a lever for reciprocating said sleeve, a ratchet and gear connection between said lever and said sleeve, a collar rotatable with said gear, a driving collar cooperating with said lever, and means for adjustably connecting said first mentioned collar to said driving collar.

11. The combination in a bolt and nut assembling machine, of a rotary head adapted to engage a bolt for rotating the same, a horizontally swinging ejector arm supported adjacent the operative position of said head, means for reciprocating said head into and out of operative position, a cam driven operating lever for driving said means, and a slide mechanism operated by said lever for swinging said ejector.

12. The combination in a bolt and nut assembling machine, of a rotary head adapted to engage a bolt for rotating the same, a horizontally swinging ejector arm supported adjacent the operative position of said head and having an extending lug secured thereto, a mechanism for reciprocating said head into and out of operative position, means operated by said mechanism for actuating a slide, said slide having an extending lug cooperating with the lug of said ejector arm, so that a movement of said mechanism will actuate said ejector.

13. The combination in a bolt and nut assembling machine, of a rotary head adapted to engage a bolt for rotating the same, a horizontally swinging ejector arm supported adjacent the operative position of said head, means for reciprocating said head into and out of operative position, means cooperating with said mechanism swinging said ejector against a bolt held by said head at the time instant when the said mechanism has lifted said head, additional means for maintaining said ejector in normally inoperative position.

14. The combination in a machine for assembling bolts and nuts, of a rotating annular head having a circularly formed inner surface, slots cut in said surface, said head being cut out below the inner ends of said slots, and having a backing plate positioned therein, wedge shaped members positioned in said slots and having their edges projecting beyond said surface for engaging a bolt head or the like, said wedges at their inner ends being positioned to abut against said backing plate, and a clamping collar for holding the inner ends of said wedges against said backing plate.

15. The combination in a machine for assembling bolts and nuts, of a rotating annular head having a circularly formed and inwardly converging and outwardly diverging inner surface, longitudinal slots cut in said surface, wedge members positioned in said slots and projecting beyond said surface for engaging a bolt head or the like, said head being cut out below the inner ends of said slots, a backing plate positioned therein, so that ends of the wedges will abut thereagainst, and a clamping collar positioned around the open and bolt receiving portion of said head for holding said wedge members in place therein.

In testimony whereof, I have hereunto subscribed my name this 15th day of March, 1928.

GEORGE S. SMITH.